United States Patent [19]
Grimm et al.

[11] Patent Number: 5,856,371
[45] Date of Patent: Jan. 5, 1999

[54] POLYURETHANE SANDWICH STRUCTURE ELEMENT AND PROCESS FOR PRODUCTION THEREOF

[75] Inventors: Wolfgang Grimm, Leverkusen; Heinz Hausmann, Leichlingen; Hans Mandel; Ernst-Christoph Prolingheuer, both of Burscheid, all of Germany

[73] Assignee: Bayer Aktiengesellschaft, Leverkusen, Germany

[21] Appl. No.: 599,694

[22] Filed: Feb. 9, 1996

[30] Foreign Application Priority Data

Feb. 23, 1995 [DE] Germany ......... 195 06 255.8

[51] Int. Cl.$^6$ ............... C08G 18/04
[52] U.S. Cl. ......... 521/159; 264/45.1; 428/160; 428/315.5; 428/318.4; 428/318.6; 428/319.3; 428/319.7; 428/324; 428/363; 428/423.1; 428/423.2
[58] Field of Search ............ 521/155, 159; 428/315.5, 160, 318.4, 318.6, 319.3, 319.7, 324, 363, 423.2, 423.1; 264/45.1

[56] References Cited

U.S. PATENT DOCUMENTS

| | | | |
|---|---|---|---|
| 3,978,258 | 8/1976 | Faust et al. | 428/160 |
| 4,061,815 | 12/1977 | Poole, Jr. | 428/215 |
| 4,273,820 | 6/1981 | Swietzer | 428/160 |
| 4,736,558 | 4/1988 | Taraba, Jr. | 428/160 |
| 4,762,746 | 8/1988 | Wesch et al. | 428/305.5 |
| 4,800,984 | 1/1989 | Kerman | 181/290 |
| 5,001,005 | 3/1991 | Blanpied | 428/283 |
| 5,087,514 | 2/1992 | Graefe . | |
| 5,089,189 | 2/1992 | Staneluis et al. | 264/45.3 |
| 5,130,175 | 7/1992 | Kuyzin et al. | 428/160 |
| 5,234,964 | 8/1993 | Lin et al. | 521/99 |
| 5,369,147 | 11/1994 | Mushovic | 523/219 |
| 5,650,225 | 7/1997 | Dutta et al. | 428/318.6 |

FOREIGN PATENT DOCUMENTS

| | | |
|---|---|---|
| 589343 | 3/1994 | European Pat. Off. . |
| 1479952 | 1/1970 | Germany . |
| 2264083 | 1/1993 | United Kingdom . |
| 94/14587 | 7/1994 | WIPO . |

*Primary Examiner*—John M. Cooney, Jr.
*Attorney, Agent, or Firm*—Joseph C. Gil; Noland J. Cheung

[57] ABSTRACT

For the production of sandwich structure elements comprising non-cellular polyurethane layers and polyurethane foamed layers which are produced on a substrate by the application of layers to a substrate, it is proposed that at least the non-cellular polyurethane layers contain 15 to 55% by weight of mica. Sandwich structure elements are obtained which are particularly dimensionally accurate and which adhere well. The effect is believed to be based on a non-homogeneous curing reaction of the mixture which reacts to form polyurethane, due to the presence of mica.

5 Claims, 3 Drawing Sheets

POLYURETHANE SANDWICH STRUCTURE ELEMENT AND PROCESS FOR PRODUCTION THEREOF

BACKGROUND OF THE INVENTION

The present invention relates to a self-supporting sandwich structure element comprising at least one solid polyurethane layer and at least one polyurethane foamed layer.

It has already been proposed, according to WO 94/14587, that sandwich structure elements comprising two-component reaction plastics be produced by the spray application in layers of corresponding reactive mixtures on to a substrate. Polyurea and mixtures of polyurea and polyesters are described as the reaction plastics. Structural elements such as these may consist of two solid reaction plastic layers and of a reaction plastic foamed layer situated therebetween. The advantages of producing sandwich structure elements by spray application in layers of two-component reactive systems result from the rapid reaction time of these systems, their processability at ambient temperature and the insignificant demands made on the mold or on the substrate. In addition, they can be produced from a homogeneous material, wherein the reactive mixture merely has to be modified by the addition of a foaming agent in order to produce the intermediate foamed layer.

It has also already been proposed, according to European patent 589,343, that sanitaryware articles, the visual and usable surfaces of which consist of polymethyl methacrylate ("PMMA"), be provided with a supporting polyurethane sandwich structure, application of the layers being effected directly on to the premolded polyurethane substrate, in layers, by means of a two-component mixing nozzle.

One problem which is addressed in the '343 reference is the adhesion of the polyurethane sandwich structure to the PMMA layer. It is proposed according to the '343 reference that the PMMA substrate be treated with a solution of an uncrosslinked, elastic polymer resin having a strong crystallization tendency. Other proposals aimed at solving the problem of adhesion between polyurethane and PMMA are referred to as prior art in the '343 reference.

A further problem associated with rapidly reacting polyurethane systems is the heat evolved during the polyisocyanate addition reaction, which cannot be dissipated rapidly enough due to the rate of the reaction and due to the thermal insulation properties of the foamed layers which are built up with the sandwich. Temperatures of 150° C. or more can easily be reached, depending on the layer structure of the sandwich. This temperature increase during the curing of the sandwich structure is particularly disadvantageous when the sandwich structure is applied to a thermoplastic material; the temperature during the coating of PMMA must not exceed 80° C., for example.

In principle it should be possible to develop mixtures which react to form polyurethane which cure more slowly due to a reduced content of catalyst. In systems such as these, however, the commencement of the reaction would also be slowed down, so that the initial flow behavior would be altered, with the effect that run-off would occur when applying the mixtures to vertical surfaces or surfaces sloping in relation to the horizontal.

Another problem, particularly during the manufacture of sandwich structure elements of large surface area, is that of distortion defects, which are due to shrinkage effects during the curing of the mixture which reacts to form polyurethane. When structural elements are produced in layers, shrinkage within the layers occurs at different times.

DESCRIPTION OF THE INVENTION

Figure 1:
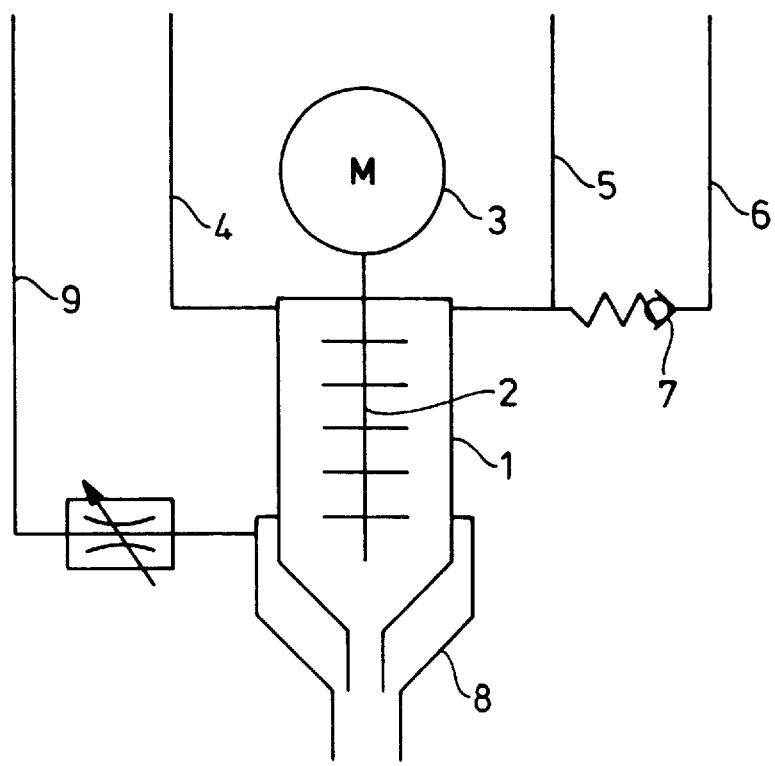
FIG. 1 illustrates a mixer unit which is suitable for spray application.

It has now been found that the above disadvantages can be overcome by using a composition which reacts to form polyurethane which contains 10 to 55% by weight, preferably 25 to 50% by weight, and particularly 30 to 40% by weight, of mica.

Accordingly, the present invention relates to self-supporting sandwich structure elements comprising at least one non-cellular polyurethane layer and at least one polyurethane foamed layer, with at least the non-cellular layer containing 10 to 55% by weight of mica.

The present invention also relates to a process for producing self-supporting sandwich structure elements comprising at least one non-cellular polyurethane layer and at least one polyurethane foamed layer, which is characterized in that the non-cellular layer and the foamed layers are produced by the successive application to a suitable substrate of a mixture which reacts to form polyurethane, wherein the mixture which reacts to form the non-cellular layers contains finely divided mica in an amount of 10 to 55% by weight with respect to the mixture.

The particle size of the mica may be between 5 and 80 µm.

Compared with a reactive mixture containing the same amount of chopped glass fibers (glass fibers and mica have about the same specific heat), the mixture which reacts to form the non-cellular polyurethane and which contains mica according to the invention exhibits a rate of temperature rise at the start of the reaction which is reduced by 25%. The time until the maximum temperature is reached is prolonged by one third. The dynamically measured increase in viscosity is also correspondingly delayed. This can be attributed to an inhibiting effect of the mica on the polyisocyanate addition reaction. The behavior of the mica-containing reactive mixture on application appears not to be changed, however. Moreover, outstanding adhesion to PMMA is achieved, even without special adhesion-enhancing measures.

It is assumed that the mica results in an inhomogeneous reaction sequence of the mixture which reacts to form polyurethane, in such a manner that the reactive mixture on the surface of the mica particles and the immediate surroundings thereof exhibits delayed curing, but that between the mica particles the reaction is not inhibited. This would explain why the non-dynamic flow behavior of the reactive mixture remains substantially unaltered. The good adhesion properties could be explained by the reactive mixture remaining mobile within the polymer matrix which has already cured, due to the delayed curing in the vicinity of the mica particles, and by this effect enabling shrinkage reactions, which impair the adhesion to the substrate, to be compensated for. An effect such as this would also explain why the good adhesion according to the invention, e.g. to PMMA substrates, as well as multilayer panels with the low distortion according to the invention due to shrinkage effects, cannot be produced by means of reactive mixtures in which the mica is replaced by other fillers, or cannot be produced by means of reactive systems which are free from fillers.

The sandwich structures according to the invention may consist of any number of layers. They preferably comprise alternating non-cellular polyurethane layers and polyurethane foamed layers. An odd number of layers is preferred, the outermost layers being non-cellular layers in each case. A number of 3 to 5 layers is particularly preferred.

The non-cellular layers may have a thickness of 0.5 to 10 mm, preferably 1 to 5 mm. The term "non-cellular layer" is to be understood according to the invention as a mica-containing polyurethane layer with a density of 0.9 to 1.2 g/cc.

The foamed layer should preferably have a thickness of 0.5 to 30 mm. Foamed layer thicknesses between 2 and 20 mm are particularly preferred. According to the invention, the foamed layer may have a density of 0.05 to 0.8 g/cc, more preferably 0.1 to 0.6 g/cc, and most preferably 0.1 to 0.4 g/cc. Foams with closed pores are preferred.

According to the invention it is not necessary for the foamed layer also to contain mica. For example, the foamed layer may contain fillers other than mica, e.g. melamine resins or comminuted polyurethane waste materials, or may also be formed without fillers. The sandwich structures preferably consist of a homogeneous material, however (in other words, the same polyisocyanates and active-hydrogen containing compounds would be the same for all layers).

The sandwich structures according to the invention are produced by applying them in layers to a substrate, preferably by spraying. In this respect the components of the mixtures which react to form polyurethane, particularly isocyanate, a filler-containing polyol mixture, and the foaming agent which is optionally separate, are added in metered amounts by means of separate lines to a suitable mixer unit, the outlet of the mixer unit being constructed as a spray head. Both high-pressure mixer units which operate by the counter-current injection method and low-pressure mixer-stirrer units are suitable as the mixer unit; see Becker/Braun: Kunststoff-Handbuch [*Plastics Handbook*], Volume 4, Polyurethanes, 1993, pages 174 to 186, for example. An additional spraying device may optionally also be provided at the outlet from the mixer head, e.g. in the form of a compressed air nozzle which concentrically surrounds the outlet of the mixer unit. The droplets produced by means of the spraying device preferably have a diameter of 0.2 to 2 mm, most preferably 0.5 to 1.5 mm.

In this respect, each of the non-cellular and foamed layers may advantageously be produced by spraying on the reactive mixture as a plurality of coats, so that, particularly when thicker layers are required, the coat which is still liquid and which has still not reacted completely in each case is prevented from running off application surfaces which slope in relation to the horizontal. In the course of this procedure, application of the successive coats is effected "wet in wet", i.e. when the preceding coat has not yet reacted completely, and in particular before the previous coat in each case has become tack-free.

Application of the first coat of a foamed layer to the last coat of the non-cellular layer situated underneath it is preferably also effected "wet in wet", i.e. before the non-cellular layer has become tack-free. The first coat of a non-cellular layer can be applied by spraying to the last coat of a foamed layer without any disadvantages if the foamed layer has already reacted, or has become tack-free.

Application of the layers of the sandwich structure may be effected by one or more mixer units. For a sandwich structure which consists of substantially identical material it may be advantageous to provide at least one mixer head in which the components of the reactive mixture to be fed in can be varied in such a way that non-cellular polyurethane and polyurethane foam can be produced alternately from this mixer head.

The invention is not restricted to sandwich structures in which the respective layers extend over the entire surface of the structure. Rather, it may be advantageous to provide non-cellular polyurethane bridges which penetrate the foamed layer and which impart a particularly good shear stability to the structure. It may also be advantageous to provide the foamed layer with regions of different foam densities, in which the foaming agent is added in adjustable, variable mounts, for example.

Moreover, it is also possible according to the invention to insert reinforcing elements and/or anchoring elements between the various layers of the sandwich structure, e.g. glass fiber strands or glass fiber fabric may be placed for reinforcement purposes on a coat which has not yet reacted, and these may be enclosed in the sandwich structure by the subsequent application of a further coat.

The substrate on which the sandwich structure is produced may be a mold which is removed after the sandwich structure has cured and which is provided with a release agent before the layer is applied.

The substrate preferably forms part of the final product, with which the sandwich structure forms a composite body. The substrate is preferably a PMMA molding which forms the visual and usable surface of a sanitaryware article. It has been found that the sandwich structure elements which contain mica according to the invention exhibit outstanding adhesion to PMMA moldings when the latter are used as the substrate for the production of the structural elements in layers. In order to obtain this outstanding adhesion it is sufficient to clean the PMMA surface to be coated with a rag soaked in n-ethanol so that it is free from grease and dust.

The sandwich structures according to the invention are not restricted to those having a uniform thickness of the layers. Rather, the layers may be of different thicknesses depending on the requirements; the thickness of each individual layer may also vary. Moreover, it is not necessary for a layer to extend continuously throughout the structural element, e.g. it is possible to control the spraying-on of the reactive mixture so that islands of foam are formed in the structural element which are penetrated by non-cellular bridges which join the non-cellular layers to each other.

Plastic or metal components, e.g. from the automobile field, are also suitable as substrates.

Moreover, the sandwich structures according to the invention can also be produced in the form of continuous sheet elements by applying the layers to a moving conveyor belt, optionally to a support which is moved on the conveyor belt and to which the coating adheres. Suitable supports comprise structured or unstructured sheets of paper, plastics or aluminum, and also steel sheets. Constructional elements are produced from continuous sandwich structure elements such as these by sawing or cutting.

Furthermore, it is not necessary according to the invention for all the layers of the sandwich structure element to be produced by successive coatings. Rather, if value is placed on a particular surface structure of both sides of the structural element for example, it is possible to produce the upper layer, e.g. the non-cellular layer, of the sandwich structure element separately and to apply this before it becomes tack-free to the uppermost layer of a separately produced sandwich structure element before this uppermost layer becomes tack-free.

All rapidly reacting mixtures which react to form polyurethane, such as those which have been developed in particular for the reaction injection molding technique (RIM technique), are suitable as the mixture which reacts to form polyurethane according to the invention. A semi-prepolymer based on MDI and polyether polyol and containing 20 to 30% by weight of NCO groups is preferably used as the isocyanate component. A polyether polyol with an OH number of 250 to 400 is preferably used as the polyol component. Suitable foaming agents include chemical foaming agents such as water, which produces carbon dioxide due to reactions with the isocyanate, or physical foaming agents such as the low-boiling liquids which are customary in polyurethane chemistry. Gases, e.g., carbon dioxide, which are soluble under pressure in at least one of the components and which are released with foaming during the release of pressure on emergence from the mixer unit, are also suitable. The use in conjunction of other fillers such as glass fibers, metal particles or colored pigments, or fillers which are used in order to increase the fire-resistance, such as melamine resins or phosphorus compounds, is also possible.

The components of the mixture which reacts to form polyurethane are preferably mixed with each other in a ratio such that the isocyanate index of the mixture is from 90 to 130.

Systems are preferably used which achieve a tack-free state within 1 to 5 minutes, most preferably within 1 to 3 minutes, after mixing.

FIG. 1 illustrates a mixer-stirrer unit 1 with a stirrer 2 which is driven via the drive motor 3. Isocyanate is fed into the top of the mixer unit via line 4. A polyol-mica mixture is fed in via line 5. The foaming agent fed in via line 6 can be switched on and off via the valve 7, so that a changeover can be made between the application of foam and non-cellular polyurethane. The outlet of the mixer unit 1 leads into a spray nozzle 8 which is acted upon by compressed air via line 9.

Figure 2:
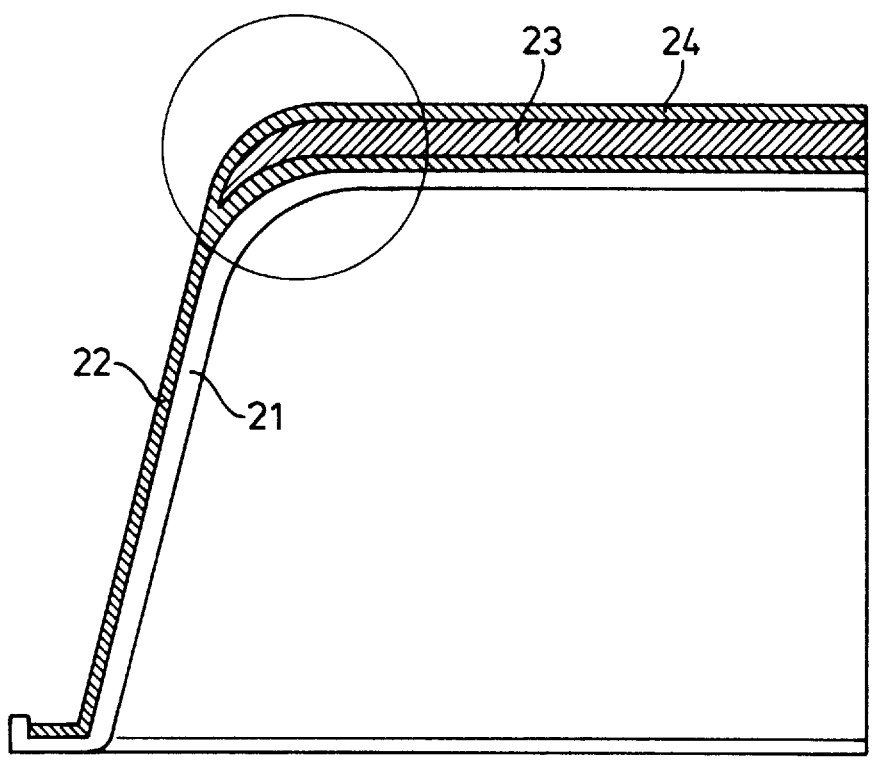
FIG. 2 illustrates a self-supporting structural element according to the invention in the form of a sanitaryware article composite component with PMMA.

FIG. 2 illustrates a section through a bathtub as an example of a sanitaryware article produced according to the invention. A first, non-cellular polyurethane layer 22 is sprayed according to the invention on to the PMMA structure with its opening placed downwards and which has an inwardly oriented visual and usable surface. This is followed by a polyurethane foamed layer 23 and by a further non-cellular polyurethane layer 24 above the latter, the layers 22, 23 and 24 forming the self-supporting structural element which adheres to the PMMA layer.

Figure 3:
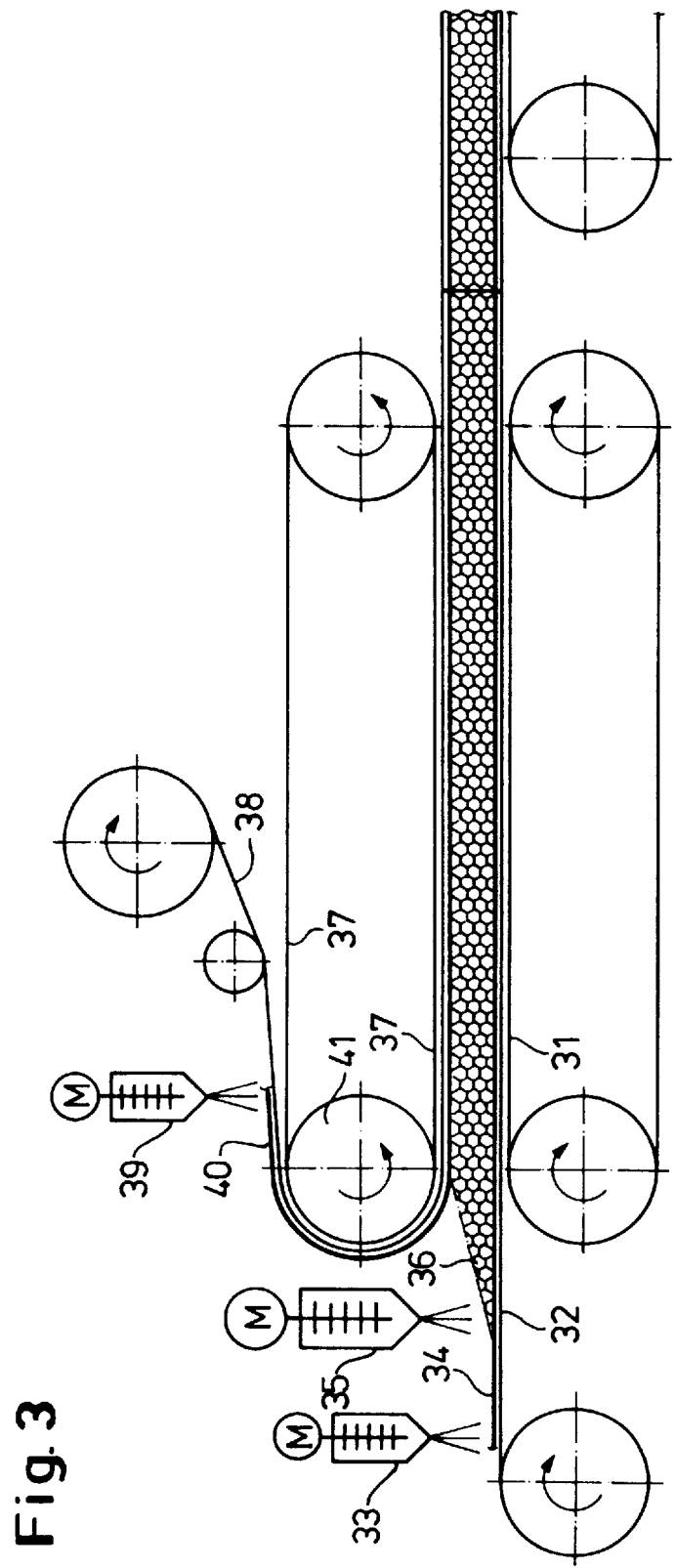
FIG. 3 illustrates a process for producing a continuous sandwich structure element, in which the upper and lower layer of the structural element are produced on different substrates.

The production of continuous structural elements according to the invention can be effected in an apparatus as shown in FIG. 3. This consists of a lower conveyor belt 31, to which a lower protective sheet 32 is fed. A non-cellular polyurethane layer is applied to the lower protective sheet 32 by means of a first mixing and application element 33 which oscillates transversely to the direction of the conveyor belt. Directly following this non-cellular polyurethane layer, the foamable mixture for producing the intermediate foamed sandwich structure element layer is applied by means of a second mixing and application element 35 which oscillates transversely to the direction of the conveyor belt. The apparatus also comprises an upper circulating conveyor belt 37, to which a protective sheet 38 is fed from above. Above this upper conveyor belt 37, a non-foaming reactive mixture 40 is applied by means of a mixing and application element which oscillates transversely to the direction of the conveyor belt. Before it has cured, this non-foaming reactive mixture is deflected over the conveying roller of the upper conveyor belt 37 and is applied to the foamed layer 36, which is still rising.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing self-supporting sandwich structure elements comprising applying at least one non-cellular polyurethane layer and at least one polyurethane foamed layer to a substrate, wherein mixtures which react to form each polyurethane layer are used which contain a polylether polyol with an OH number of 250 to 400, a semi-prepolymer based on MDI and polyether polyol and containing 20 to 30% by weight NCO, and optionally foaming agents, wherein the mixtures are reacted at an isocyanate index of from 90 to 130, wherein at least the non-cellular polyurethane layers have a content of 10 to 55% by weight of finely divided mica, and wherein the layers of the sandwich structure element are applied successively to a substrate, wherein the next layer is applied in each case before the layer situated below it has become tack-free.

2. The process of claim 1, wherein the layers are applied by means of one or more mixer units, wherein in at least one of the mixer units the components of the reactive mixture which are to be fed can be varied during the application in such a way that non-cellular polyurethane and polyurethane foam can be produced alternately.

3. The process of claim 1, wherein each layer is produced from a plurality of coats by spray application.

4. The process of claim 1, wherein said substrate is polymethylmethacrylate.

5. The process of claim 1, wherein glass fiber reinforcing fabrics are inserted in at least one of non-cellular polyurethane layers.

* * * * *